INVENTOR.
LOUIS C. HRUSCH

July 30, 1963 L. C. HRUSCH 3,099,424
AIRCRAFT STEERING SYSTEM CONTROL
Filed July 28, 1961 4 Sheets-Sheet 2

INVENTOR.
LOUIS C. HRUSCH
BY
John Wade Bell Jr.
Attorney

INVENTOR.
LOUIS C. HRUSCH
BY
John Wade Ball Jr.
Attorney

3,099,424
AIRCRAFT STEERING SYSTEM CONTROL
Louis C. Hrusch, Newburgh Heights, Ohio, assignor to Cleveland Pneumatic Industries, Inc., Cleveland, Ohio, a corporation of Ohio
Filed July 28, 1961, Ser. No. 127,532
8 Claims. (Cl. 244—50)

This invention relates generally to steering systems and more particularly to a new and improved steering control for aircraft landing gears.

It is necessary to provide power steering to control the ground maneuvering of large aircraft since the required steering power is far in excess of the physical capabilities of the pilot. Even on smaller aircrafts where the pilot's physical capabilities match the steering power required, it is common to provide power steering to improve the ease of handling.

An aircraft steering system incorporating this invention provides a simplified control and follow up for the hydraulic or pneumatic valve used to operate the steering motor. The follow up stem is arranged to make maximum utilization of rigid, mechanical connections which improves reliability and reduces service and maintenance requirements to the minimum. The structure also results in a system wherein the amount of turning is a direct function of the movement of the control by the pilot.

It is an important object of this invention to provide an improved aircraft steering system incorporating a feed back control having rigid gear type connections between the control device and the steering motor controlled thereby.

It is another important object of this invention to provide a new and improved steering motor control wherein the sensing or feed back is provided by a rack and gear connection between the valve operator and the output element of the steering motor.

It is still another object of this invention to provide an aircraft steering system control minimizing the required number of cable connections to improve reliability.

It is still another object of this invention to provide a new and improved aircraft steering system incorporating a simplified feed back control which can be used to provide manual steering in the event of failure of the power steering system.

Further objects and advantages will appear from the following description and drawings wherein.

Figure 1:
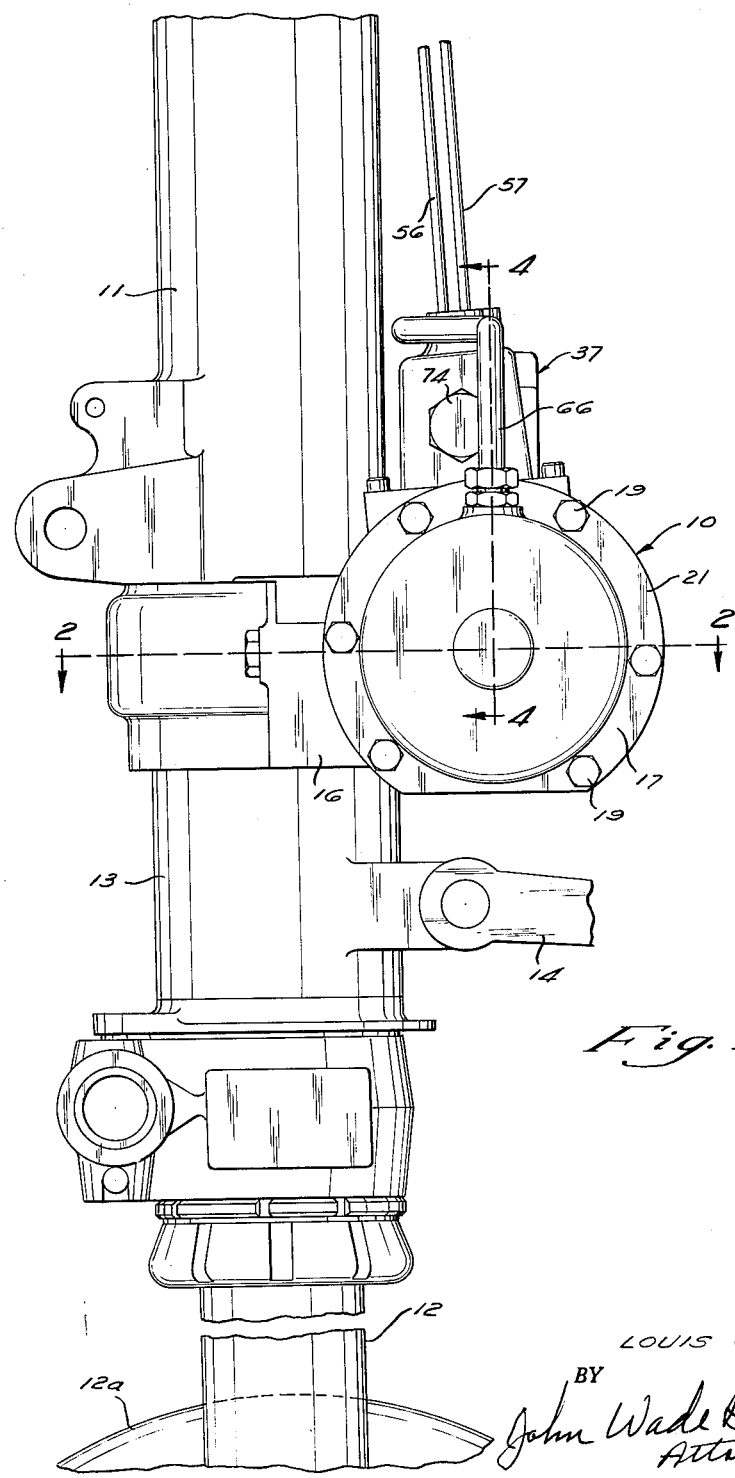
FIGURE 1 is a fragmentary side elevation of a steering system incorporating this invention as it would be installed on an aircraft landing gear.

In FIGURE 1 the steering system incorporating the invention is shown as it would be mounted on a typical nose landing gear for aircraft. Since the landing gear per se forms no part of this invention excepting insofar as it cooperates with the steering system, it has been illustrated only fragmentarily. A steering motor 10 is mounted on the upper strut 11 which in turn would be mounted on the aircraft frame. A lower telescoping strut 12 cooperates in the usual manner with the strut 11 to define a fluid spring used to resiliently support the aircraft on the ground. A landing wheel 12a is journaled on the lower end of the strut 12 in the usual manner. A steering collar 13 is journaled on the upper strut 11 for rotation about the central axis thereof and is connected to the strut 12 by torque arms 14. The torque arm connection is arranged so that the steering collar is rotationally fixed relative to the lower strut 12 but permits axial movement of the strut 12 relative to the strut 11 and steering collar 13.

Figure 2:
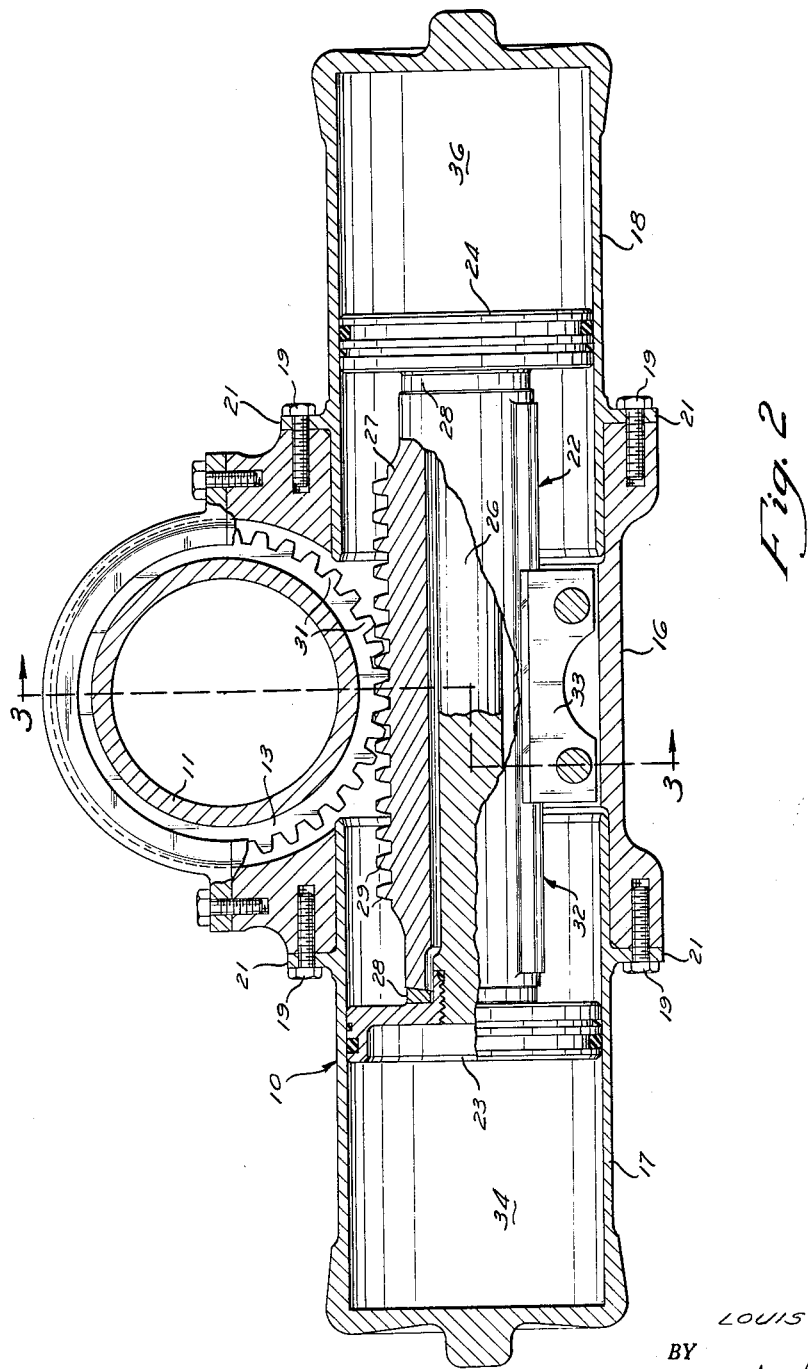
FIGURE 2 is a plan view taken along 2—2 of FIGURE 1 partially in section illustrating the structure of the fluid motor used to provide steering power.

Referring to FIGURE 2 the steering motor 10 includes a housing 16 which is rigidly connected to the strut 11. Opposed cylinders 17 and 18 extend into opposite ends of the housing 16 and are bolted thereto by bolts 19 which extend through flanges 21. A piston assembly 22 is provided with a first piston head 23 in the cylinder 17 and a second piston head 24 in the cylinder 18. The two piston heads 23 and 24 are mounted on the opposite ends of a tie rod 26 which extends through a tubular rack member 27. A mounting ring 28 is located at each end of the rack member 27 for engagement with the associated piston head 23 or 24 when the piston heads are threaded along the tie rod 26 to clamp the piston head assembly together.

The rack member 27 is formed with rack teeth 29 which mesh with teeth 31 formed on the steering collar 13 so that axial movement of the piston assembly 22 produces rotation of the steering collar 13. The side of the rack member 27 opposite the teeth 29 is formed with a dovetail 32 (best illustrated in FIGURE 3) which is supported in a bearing block 33 mounted in the housing 16. The bearing 33 serves the dual function of preventing rotation of the piston assembly 22 and laterally supporting the rack member 27. By laterally supporting the piston assembly 22 within the bearing 33, a structure is provided which eliminates side loadings on the piston heads 23 and 24.

The piston head 23 in cooperation with the cylinder 17 defines a first variable volume pressure chamber 34, and the piston head 24 cooperates with the cylinder 18 to define a variable volume pressure chamber 36. When fluid under pressure is introduced to the pressure chamber 34 and the pressure chamber 36 is exhausted, the fluid operates to produce a force on the piston assembly 22 causing rightward movement of the assembly. Conversely, when the opposite fluid connections are made, the piston assembly 22 moves to the left. Thus, properly controlled fluid pressure supplied to either the chamber 34 or the chamber 36 produces controlled rotation of the steering collar 13 and in turn the landing gear wheel 12a. This structural arrangement has the advantage of providing constant torque throughout the range of steering which is particularly advantageous in aircraft installations since the steering system must be arranged to provide sufficient torque to turn the landing wheel through the full range of steering when the aircraft is stationary.

Figure 3:
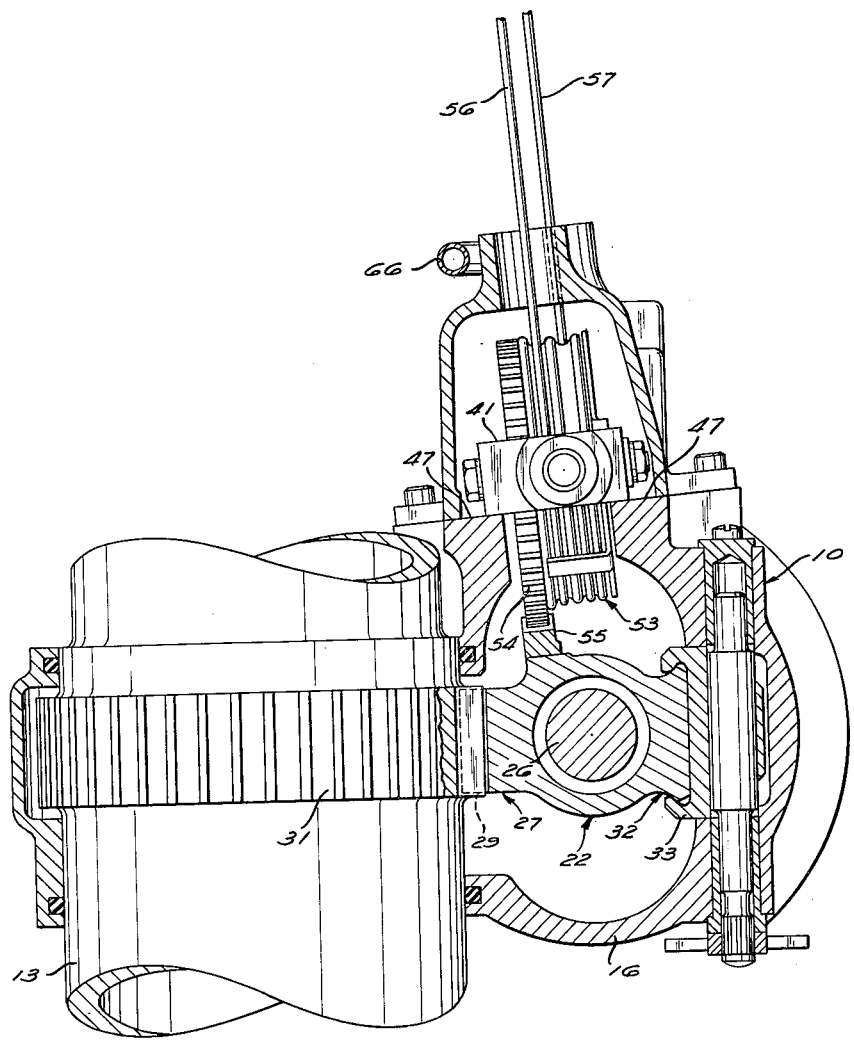
FIGURE 3 is a fragmentary section taken along 3—3 of FIGURE 2 with some parts removed for purposes of illustration.
Figures 4, 5:
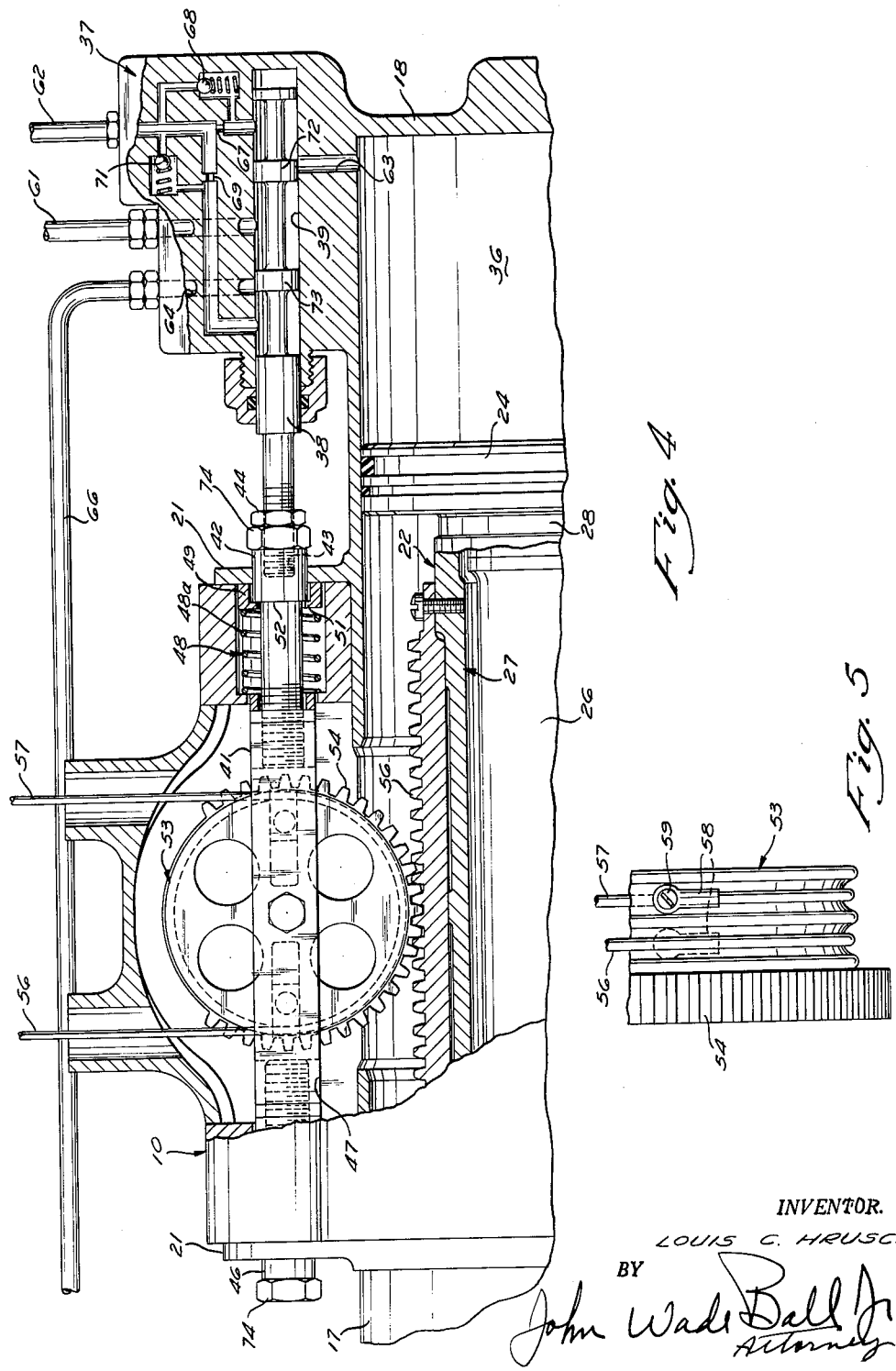
FIGURE 4 is an enlarged fragmentary side elevation partially in longitudinal section illustrating the valve structure and the valve operator incorporating this invention.
FIGURE 5 is a fragmentary enlarged view of one form of cable anchor used to anchor the cable to the follow up mechanism.

To control the operation of the fluid motor a system illustrated in FIGURES 3 to 5 is used. A valve assembly 37 is located on the cylinder 18 and is provided with a spool 38 which projects into a valve bore 39. A valve operating yoke 41 is mounted in the housing 18 for reciprocating movement in a direction parallel to the movement of the piston assembly 22. An adapter 42 is threaded into one end of the yoke 41 and in turn is provided with a tap hole 43 into which the end of the spool 38 is threaded. A nut 44 locks the spool in its adjusted position. The adapter 42 cooperates with a second adapter 46 to laterally support the yoke 41. The yoke 41 is restrained against rotation by engagement with shoulders 47 in the housing 18 as illustrated in FIGURE 3.

The yoke 41 is resiliently urged toward a neutral position by opposed and similar centering spring assemblies 48, one of which acts against each of the adapters 42 and 46. Only one is illustarted in detail in FIGURE 4 but the structure shown is identical and opposite the assembly adjacent the adapter 46. A centering spring 48a extends into engagement with a collar 49 engaging the flange 21 when the yoke 41 is in the neutral position. A shoulder 51 on the collar 49 engages an opposing shoulder 52 on the associated adapter so that movement of the yoke 41 in either direction from the neutral position will lift one collar 49 away from its associated flange 21 and compress the associated spring 48a. Thus, the yoke is resiliently maintained in the neutral position but is movable against the action of the centering springs in either direction therefrom.

A control pulley assembly 53 is journaled on the yoke 41 and is provided with a gear sector 54 meshing with a control gear rack 55 mounted on the piston assembly 22. Thus, if the control pulley assembly 53 is rotated while the piston assembly 22 remains stationary, the yoke 41 moves in the direction of rotation. Conversely, if the piston assembly 22 moves axially while the control pulley assembly 53 is not rotating, the yoke moves in the direction of piston movement. This provides the feed back which automatically controls the fluid motor through the operation of the valve so that the movement of the piston assembly 22 is directly related to the amount of rotation of the control pulley assembly 53.

A pair of cables 56 and 57 are connected to the control pulley assembly by terminals 58 and bolts 59 best illustrated in FIGURE 5. As viewed in FIGURE 4, the cable 56 extends upwardly from the left side of the pulley assembly 53 and the cable 57 extends upwardly from the right side. If the tension in the cable 56 exceeds the tension in the cable 57, a torque is applied to the control pulley assembly 53 causing clockwise rotation. Conversely, if the tension in the cable 57 exceeds the tension in the cable 56, counter-clockwise rotation results.

The valve assembly 37 is of the four-way valve having a pressure line 61 connected to any suitable source of fluid under pressure and an exhaust or reservoir return line 62. Normally, provisions are provided in the exhaust line 62 to maintain a back pressure on the system in the order of 50 pounds per square inch to prevent cavitation during damping operation.

A first controlled port 63 connects the valve bore 39 to the pressure chamber 36 and a second controlled port 64 connects the valve bore 39 to the pressure chamber 34 through a pressure line 66. The exhaust 62 connects with the valve bore 39 to the right of the controlled port 63 through an orifice flow restriction 67. A back check valve 68 operates to bypass the orifice 67 to permit flow around the orifice 67 in a direction toward the valve bore 39. The exhaust 62 is also connected to the valve bore 39 to the left of the controlled port 64 through a second orifice flow restriction 69 and a back check valve 71.

The valve spool 38 is formed with a first land 72 which isolates the controlled port 63 from the pressure line 61 when the valve spool is in the neutral position illustrated, and a second land 73 which similarly isolates the pressure line 61 from the controlled port 64 when the valve is in the neutral position. The various elements are proportioned so that the two controlled ports 63 and 64 are both connected to the exhaust 62 through their respective orifices 67 and 69 and the associated back check valves 68 and 71 when the valve is in the neutral position.

Movement of the valve spool 38 to the left operates to first isolate the controlled port 64 from the exhaust 62 and thereafter establishes communication between the exhaust port 64 and the pressure line 61. During such movement the connection between the controlled port 63 and the exhaust 62 is maintained. Movement of the spool valve 38 to the right, however, connects the controlled port 63 with the pressure line while maintaining the connection between the controlled port 64 and the exhaust 62. The valve spool 38 is therefore moved to the right when it is desired to cause displacement of the piston assembly 23 to the left and moved to the left when rightward piston displacement is required. When the valve spool 38 is in the neutral position, however, the two pressure chambers 34 and 36 are connected together through the damping orifices 67 and 69. In this condition shimmy damping is provided and the back pressure maintained on the exhaust line 62 in cooperation with the two back check valves 68 and 71 to prevent cavitation in the fluid.

When steering is required in the direction which results from movement of the piston assembly 22 to the left, the steering control device operated by the pilot is moved in such a way to cause the tension in the control cable 56 to exceed tension in control cable 57. This operates to rotate the control pulley assembly 53 in a clockwise direction and causes displacement of the valve spool 38 to the right against the action of the centering spring 48a at the left end of the yoke 41. This displacement of the valve spool 38 pressurizes the pressure chamber 36 while retaining the connection between the pressure chamber 34 and the exhaust 62. As a result, the piston assembly 22 moves to the left under the influence of the fluid pressure within the pressure chamber 36. If the tension in the cable 56 is maintained at a level higher than the tension on the cable 57, the valve spool will be retained in the position of rightward displacement and the piston assembly 22 will continue to move to the left.

During the leftward movement of the piston assembly 22, the inter-action of the gear teeth on the control rack 55 and pulley assembly 53 permits the yoke 41 to remain stationary in its rightward displaced position while the control pulley 53 rotates through an arc which is directly a function of the axial displacement of a piston assembly 22. As soon as the tension in the two control cables 56 and 57 is equalized, the control pulley assembly stops rotating. When this occurs, the continued leftward movement of the piston assembly 22 through its gear connection to the control pulley assembly moves the pulley assembly 53 to the left returning the yoke 41 and the valve spool 38 to the neutral position. Therefore, the amount of axial displacement of the piston assembly 22 is a direct function of the amount of relative movement between the two control cables 56 and 57 produced by the aircraft pilot.

If the aircraft pilot wishes to steer in the opposite direction, he moves his control device in a direction which would cause a tension in the cable 57 which exceeds the tension in the cable 56. This produces counter-clockwise rotation of the pulley and displacement of the yoke 41 and valve spool 38 to the left. Such movement results in piston assembly 22 displacement to the right. Again, the amount of displacement of the piston assembly 22 is a direct function of the amount of relative movement between the cables 56 and 57. The control cables 56 and 57 may be connected to any suitable control device in the aircraft cockpit. In some installations the control cables are connected to the rudder pedals and in others they are connected directly to a separate steering control device or wheel.

Because of the positive mechanical connection provided by the control rack 55 engaging the gear teeth 54 of the control pulley 53, a reliable system is provided which is not subject to slippage or breakage.

In some aircraft installations power steering is provided even though the pilot effort could meet the steering loads. In such installations the system will operate to provide manual steering in the event of power failure. If such failure occurs, the enlarged head portions 74 on one or the other of the adapters 42 and 46 move into engagement with the associated flange 21, to prevent displacement of the yoke 41 beyond a predetermined position. When this occurs, the tension in the cables 56 and 57 continues to rotate the pulley 53, and as a result, cause piston displacement and steering in response to a manual effort.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. An aircraft steering system comprising a fluid motor having an output element connected to steer a landing wheel, a control valve connected to said motor operable to control the amount of and direction of movement of said output element, a yoke connected to said valve movable in opposite directions from a neutral position operable when in said neutral position to position said valve in a valve neutral position in which said motor is nonoperative and when moved in either direction from said yoke neutral position to move said valve to positions in which said motor is operated, a rack mounted for movement with said output element, a gear journaled on said yoke meshed with said rack, and control elements connected to rotate said gear and thereby cause said yoke to be displaced from said yoke neutral position.

2. An aircraft steering system comprising a fluid motor having an output element connected to steer a landing wheel, a control valve connected to said motor operable to control the amount of movement and direction of movement of said output element, a yoke connected to said valve movable in opposite directions from a neutral position operable when in said neutral position to position said valve in a valve neutral position in which said motor is nonoperative and when moved in either direction from said yoke neutral position to move said valve to positions in which said motor is operated, a rack mounted on said output element, a gear mounted on said yoke meshed with said rack, a pair of opposing cables anchored on said gear operable to apply torque to said gear and thereby cause said yoke to be displaced from said yoke neutral position.

3. An aircraft steering system comprising a cylinder, a piston movable under the influence of fluid under pressure connected to steer a landing wheel, a control valve connected to said cylinder operable to control the amount of movement and direction of movement of said piston, a yoke connected to said valve movable in a direction parallel to the direction of movement of said piston position and operable when in said neutral position to position said valve in a valve neutral position and when moved in either direction from said yoke neutral position to move said valve to positions in which said motor is operated, a rack mounted on said piston, a gear on said yoke meshed with said rack, a pair of opposed cables anchored on said gear to rotate said gear and thereby cause said yoke to be displaced from said yoke neutral position, and resilient means urging said valve to its neutral position.

4. A steering system for an aircraft landing wheel comprising a fluid motor having cylinder and piston members, a connection between one member and said wheel operable to steer said wheel in response to relative movement between said members, a valve mounted on the other of said members operable to supply fluid under pressure to said motor and control the relative movement between said members, a yoke supported on said other member for movement relative thereto and connected to operate said valve, a control gear journaled on said yoke, a rack on said one member formed with gear teeth meshing with said gear, and control elements connected to apply torque to said gear, causing said gear and yoke to move relative to said other member and operate said valve thereby controlling the relative movement between said members.

5. A steering system for an aircraft landing wheel comprising a fluid motor having cylinder and piston, a connection between said piston and said wheel operable to steer said wheel in response to relative movement between said members, a valve mounted on said cylinder operable to supply fluid under pressure to said motor and control the movement of said piston, a yoke supported on said cylinder for limited movement relative thereto and connected to operate said valve, a control gear journaled on said yoke having a pulley portion thereon, a rack on said piston meshing with said gear, a pair of opposed cables anchored to said pulley portion of said gear operable to apply torque thereto, causing said gear and yoke to move relative to said cylinder and operate said valve thereby controlling the relative movement between said members.

6. An aircraft steering system comprising a strut adapted to be mounted on an aircraft, a steerable wheel on said strut, a collar journaled for rotation on said strut connected to steer said wheel, a cylinder mounted on said strut, a piston movable in said cylinder under the influence of fluid under pressure, gearing connecting said piston and collar, a valve on said cylinder having a valving element movable to control fluid under pressure supplied to said cylinder and thereby control movement of said piston, a yoke on said cylinder movable in a direction parallel to the direction of movement of said piston connected to move said valving element, a pulley journaled on said yoke, meshing gear teeth on said pulley assembly and said piston, and control elements connected to said pulley assembly operable to apply torque to said pulley assembly and produce movement of said yoke and valving element.

7. An aircraft steering system comprising a strut adapted to be mounted on an aircraft, a steerable wheel on said strut, a collar journaled for rotation on said strut connected to steer said wheel, a cylinder mounted on said strut, a piston movable in said cylinder under the influence of fluid under pressure, gearing connecting said piston and collar whereby piston movement results in collar rotation, a valve on said cylinder having a valving element movable to control fluid under pressure supplied to said cylinder and thereby control movement of said piston, a yoke on said cylinder movable in a direction parallel to the direction of movement of said piston connected to move said valving element, opposed stops limiting movement of said yoke, a pulley assembly journaled on said yoke, meshing gear teeth on said pulley assembly and said piston, and opposed cables anchored on said pulley assembly operable to apply torque to said pulley and produce movement of said yoke and valving element.

8. An aircraft steering system comprising a strut adapted to be mounted on an aircraft, a steerable wheel on said strut, a collar journaled for rotation on said strut connected to steer said wheel, a cylinder mounted on said strut, a piston movable in said cylinder under the influence of fluid under pressure, gearing connecting said piston and collar whereby piston movement results in collar rotation, a valve on said cylinder having a valving element movable from a neutral position in which said piston is not moved by fluid pressure to operating positions in which fluid under pressure is supplied to said cylinder to move said piston, a yoke on said cylinder movable in a direction parallel to the direction of movement of said piston connected to move said valving element to said operating positions, a pulley assembly journaled on said yoke, meshing gear teeth on said pulley assembly and said piston, and opposed control cables anchored on said pulley assembly operable to apply torque to said pulley assembly and produce movement of said yoke and valving element whereby relative movement between said cables produces powered movement of said piston through a distance which is a direct function of such relative movement.

References Cited in the file of this patent
UNITED STATES PATENTS
2,712,422    Gerwig _____ July 5, 1955